(12) United States Patent
Feng et al.

(10) Patent No.: US 10,798,570 B2
(45) Date of Patent: Oct. 6, 2020

(54) TERMINAL AUTHENTICATION METHOD AND DEVICE

(71) Applicant: GUANGDONG OPPO MOBILE TELECOMMUNICATIONS CORP., LTD., Dongguan, Guangdong (CN)

(72) Inventors: Bin Feng, Dongguan (CN); Hai Tang, Dongguan (CN)

(73) Assignee: GUNAGDONG OPPO MOBILE TELECOMMUNICATIONS CORP. LTD., Dongguan, Guangdong (CN)

( * ) Notice: Subject to any disclaimer, the term of this patent is extended or adjusted under 35 U.S.C. 154(b) by 0 days.

(21) Appl. No.: 15/738,414

(22) PCT Filed: Sep. 25, 2015

(86) PCT No.: PCT/CN2015/090752
§ 371 (c)(1),
(2) Date: Dec. 20, 2017

(87) PCT Pub. No.: WO2017/049598
PCT Pub. Date: Mar. 30, 2017

(65) Prior Publication Data
US 2018/0279122 A1  Sep. 27, 2018

(51) Int. Cl.
*H04W 12/06* (2009.01)
*H04L 29/06* (2006.01)
*H04W 12/04* (2009.01)

(52) U.S. Cl.
CPC .............. *H04W 12/06* (2013.01); *H04L 63/08* (2013.01); *H04L 63/0823* (2013.01);
(Continued)

(58) Field of Classification Search
CPC ...... H04W 12/06; H04W 12/04; H04L 63/08; H04L 63/0823; H04L 63/0853; H04L 63/0861; H04L 63/102; H04L 63/105
See application file for complete search history.

(56) References Cited

U.S. PATENT DOCUMENTS 9,055,062 B1 * 6/2015 Huang ............... H04L 63/0884
10,164,976 B2 * 12/2018 Bae ...................... H04W 12/06
(Continued)

FOREIGN PATENT DOCUMENTS

| CN | 101409880 A | 4/2009 |
|---|---|---|
| CN | 101442733 A | 5/2009 |

(Continued)

OTHER PUBLICATIONS

Google Scholar Search Results.*
(Continued)

*Primary Examiner* — Qun Shen

(57) ABSTRACT

Embodiments provide a terminal authentication method and device. The method includes that: a Service Provider (SP) device receives a first authentication request sent by a first terminal, the first authentication request including a first identity credential of a user; the SP device determines an Identifier (ID) of the user and a priority of the first identity credential according to the first authentication request; the SP device sends context data of the user to the first terminal through a cloud service; and the SP device enables a first service for the first terminal according to the priority of the first identity credential. In the embodiments, the SP device loads the context data of the user for the terminal according to the identity credential, sent by the terminal, of the user, and provides the corresponding service.

17 Claims, 10 Drawing Sheets

(52) U.S. Cl.
CPC ...... *H04L 63/0853* (2013.01); *H04L 63/0861* (2013.01); *H04L 63/102* (2013.01); *H04L 63/105* (2013.01); *H04W 12/04* (2013.01)

(56) References Cited

U.S. PATENT DOCUMENTS

| | | | | |
|---|---|---|---|---|
| 2008/0263629 | A1* | 10/2008 | Anderson | H04L 9/0894 726/2 |
| 2009/0007234 | A1* | 1/2009 | Birger | H04L 29/12207 726/3 |
| 2009/0213796 | A1* | 8/2009 | Broshi | H04W 76/11 370/328 |
| 2011/0055913 | A1* | 3/2011 | Wong | H04L 63/08 726/9 |
| 2013/0061291 | A1* | 3/2013 | Hegg | G06F 21/33 726/4 |
| 2013/0263286 | A1* | 10/2013 | Aillery | H04L 9/3215 726/28 |
| 2014/0075526 | A1* | 3/2014 | Kim | H04L 63/105 726/7 |
| 2015/0002461 | A1* | 1/2015 | Guarneri | G06F 3/04886 345/174 |
| 2015/0087289 | A1* | 3/2015 | Ahn | H04W 4/50 455/419 |
| 2015/0172922 | A1 | 6/2015 | An et al. | |
| 2015/0227725 | A1* | 8/2015 | Grigg | G06F 21/31 726/7 |
| 2015/0235018 | A1* | 8/2015 | Gupta | G06F 21/36 726/19 |
| 2015/0242611 | A1* | 8/2015 | Cotterill | G06F 21/35 726/17 |
| 2015/0278498 | A1* | 10/2015 | Hong | H04W 12/06 340/5.82 |
| 2015/0341344 | A1* | 11/2015 | Dorfman | H04L 63/0823 726/7 |
| 2017/0134951 | A1* | 5/2017 | Zhou | H04W 8/26 |

FOREIGN PATENT DOCUMENTS

| | | |
|---|---|---|
| CN | 102149170 A | 8/2011 |
| CN | 102307097 A | 1/2012 |
| CN | 103188076 A | 7/2013 |
| CN | 103209160 A | 7/2013 |
| CN | 104469765 A | 3/2015 |
| CN | 104469766 A | 3/2015 |
| CN | 104717648 A | 6/2015 |
| EP | 2854433 A1 | 4/2015 |

OTHER PUBLICATIONS

English Translation of International Search Report in international application No. PCT/CN2015/090752 dated Jun. 22, 2016.
Written Opinion of the International Search Authority in international application No. PCT/CN2015/090752, dated Jun. 22, 2016.
CN104469765A English_Abstract.
CN104469766A English_Abstract.
CN102149170A English_Abstract.
CN101442733A English_Abstract.
CN102307097A English_Abstract.
CN104717648A English_Abstract.
CN103209160A English_Abstract.
CN103188076A English_Abstract.
CN101409880A English_Abstract.
Supplementary European Search Report in European application No. 15904474.2, dated Dec. 14, 2018.
English Translation of the Written Opinion of the International Search Authority in international application No. PCT/CN2015/090752, dated Jun. 22, 2016.
First Office Action of the Indian application No. 201817005315, dated Apr. 27, 2020.

* cited by examiner

TERMINAL AUTHENTICATION METHOD AND DEVICE

RELATED APPLICATION

This application is an application under 35 U.S.C. 371 of International Application No. PCT/CN2015/090752 filed on Sep. 25, 2015, the entire contents of which are incorporated herein by reference.

TECHNICAL FIELD

Embodiments of the disclosure relate to the field of communications, and more particularly to a terminal authentication method and device.

BACKGROUND

In an existing mobile communication system, an operator provides a Subscriber Identity Module (SIM) card for a user, and a cellular system uses the SIM card provided by the operator for identity authentication. A user may use services provided by multiple operators only after applying to different operators for SIM cards respectively. Moreover, when the SIM cards are lost or damaged, the user may not access networks of the operators and thus may not use the services.

In addition, since a phone number may be used with only one terminal device at a time, when a user wants to replace his/her terminal device, a SIM card has to be simultaneously transferred. However, at present, different terminal devices have different specification requirements on SIM cards. Therefore, when replacing the terminal device, the user may have to go to an operator to replace the SIM card or use an adapter. This may bring inconvenience to the user, cause high overhead of the user and even damage the SIM card or the terminal device due to a failure of the adapter.

In view of the above, an existing manner forms many limits to the user's usage of services of an operator, brings great inconvenience to the user and even may cause high overhead of the user.

SUMMARY

Embodiments of the disclosure provide a terminal authentication method and device, which may provide a seamless user experience for a user, improve usability and implement optimal utilization of resources.

A first aspect provides a terminal authentication method, which may include that: a Service Provider (SP) device receives a first authentication request sent by a first terminal, the first authentication request including a first identity credential of a user; the SP device determines an Identifier (ID) of the user and a priority of the first identity credential according to the first authentication request; the SP device sends context data of the user to the first terminal through a cloud service; and the SP device enables a first service for the first terminal according to the priority of the first identity credential.

A second aspect provides a terminal authentication method, which may include that: a terminal generates an authentication request of requesting to access SP device, the authentication request including an identity credential of a user; the terminal sends the authentication request to the SP device; when the authentication request is accepted, the terminal acquires and loads context data of the user; and the terminal uses a corresponding service provided for the terminal by the SP device according to a priority of the identity credential.

A third aspect provides SP device, which may include: a receiving unit, configured to receive a first authentication request sent by a first terminal, the first authentication request including a first identity credential of a user; a determination unit, configured to determine an ID of the user and a priority of the first identity credential according to the first authentication request; a sending unit, configured to send context data of the user to the first terminal through a cloud service; and a processing unit, configured to enable a first service for the first terminal according to the priority of the first identity credential.

A fourth aspect provides a terminal, which may include: a generation unit, configured to generate an authentication request of requesting to access SP device, the authentication request including an identity credential of a user; a sending unit, configured to send the authentication request to the SP device; an acquisition unit, configured to, when the authentication request is accepted, acquire and load context data of the user; and a processing unit, configured to use a corresponding service provided for the terminal by the SP device according to a priority of the identity credential.

According to the embodiments of the disclosure, the SP device loads the context data of the user and provides the corresponding service for the terminal according to the identity credential of the user sent by the terminal. In such a manner, a unified security identity authentication manner may be implemented, a seamless user experience may be offered for the user, usability may be improved, and optimal utilization of resources may also be implemented.

BRIEF DESCRIPTION OF DRAWINGS

In order to describe the technical solutions of the embodiments of the disclosure more clearly, the drawings required to be used for descriptions about the embodiments or a conventional art will be simply introduced below. Apparently, the drawings described below are only some embodiments of the disclosure. For those skilled in the art, other drawings may further be obtained according to these drawings without creative work.

DETAILED DESCRIPTION

The technical solutions in the embodiments of the disclosure will be clearly and completely described below in combination with the drawings in the embodiments of the disclosure. Apparently, the described embodiments are not all embodiments but part of embodiments of the disclosure. All other embodiments obtained by those skilled in the art on the basis of the embodiments in the disclosure without creative work fall within the scope of protection of the disclosure.

It is to be noted that, in the embodiments of the disclosure, a terminal may also be called as User Equipment (UE), including, but not limited to, a device with a wireless communication function. For example, the terminal may be a device capable of using the communication service, such as a handheld terminal, a vehicle-mounted device, a wearable device, a home intelligent device and a sensor, and for example, may be a cellular phone like an intelligent mobile phone.

In the embodiments of the disclosure, an operator may provide a service for a user through an SP device, wherein the provided service includes, but not limited to: conventional communication service of voices, audios and data, and service which may emerge in the future such as the Internet of vehicles, the Internet of things, intelligent transportation, smart home, medical monitoring and sensor networks.

Figure 1:
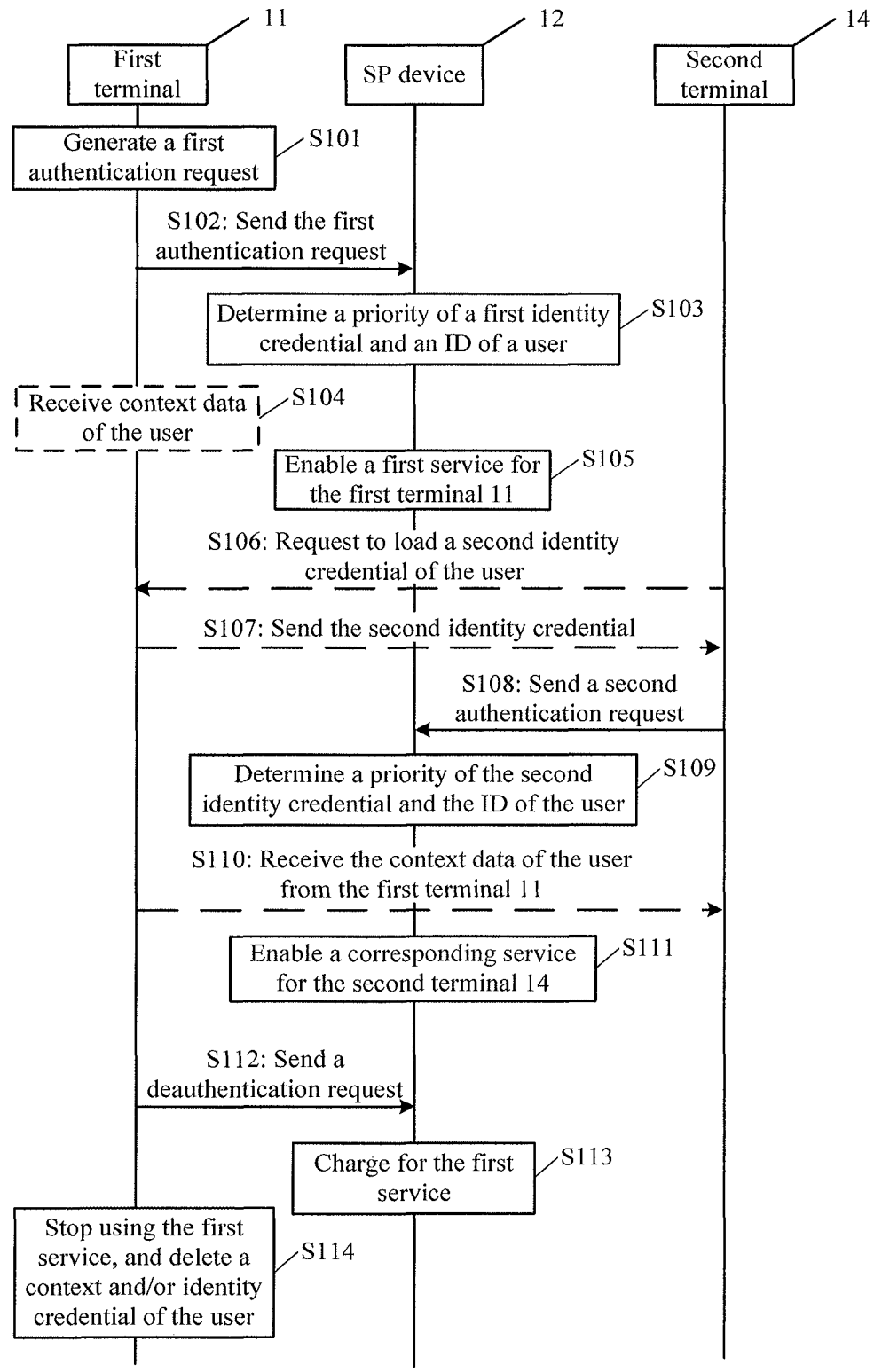
FIG. 1 illustrates a schematic flowchart of a terminal authentication method according to an embodiment of the disclosure.

FIG. 1 illustrates a schematic flowchart of a terminal authentication method 100 according to an embodiment of the disclosure. In FIG. 1, a first terminal 11, an SP device 12 and a second terminal 14 are shown.

In the embodiment of the disclosure, there is made such a hypothesis that the first terminal 11 and the second terminal 14 are used by the same user, and are not in a service state in an initial state, that is, the user does not use the first terminal 11 to access a mobile network, and also does not use the second terminal 14 to access the mobile network.

In S101, when the user is intended to use the first terminal 11 to access the mobile network to use a service provided by the mobile network, the first terminal 11 generates a first authentication request to request to access the SP device 12, wherein the first authentication request includes a first identity credential of the user.

In the embodiment of the disclosure, an identity credential is a characteristic of an identity of a user. The identity credential may include a primary credential and a secondary credential, wherein the primary credential may include at least one of: a DeoxyriboNucleic Acid (DNA), a fingerprint, an iris, a voiceprint and the like; and the secondary credential may include at least one of: a digital certificate, a digital signature, a user card, a password and the like. Moreover, the identity credential may implement identity binding authentication with another certificate, wherein the other certificate may be, for example, a certificate issued by an authority. For example, the certificate issued by the authority may be an identity card number or a passport number. In the embodiment of the disclosure, the other certificate may be determined as an ID of the first user.

In the embodiment of the disclosure, different identity credentials may have different priorities. A priority of a primary credential is higher than a priority of a secondary credential. Moreover, specifically, the DNA may be determined to have a highest priority, the fingerprint has a second priority, the iris has a third priority, the voiceprint has a fourth priority, . . . , and the password has a lowest priority.

Here, the DNA may be determined by collecting blood, saliva or the like. The fingerprint may be fingerprint information of multiple fingers or fingerprint information of one finger, or may be part of fingerprint information of a finger. Moreover, a priority of fingers of multiple fingers may be higher than a priority of a fingerprint of one finger. The iris may be irises of double eyes or a single eye.

For example, the user card may be a SIM card. The password may be a long character string or a short character string, or may also be a sequence of motions on a figure.

It can be understood that, due to hardware differences of different terminals, different user credentials may be supported to be input. For example, some terminals may acquire iris information of users through cameras, and some terminals may acquire fingerprint information of users through specific regions. Some terminal will also collect blood, salvia or the like for DNA recognition in a specific manner in the future.

It can further be understood that, in the embodiment of the disclosure, the identity credential of the user may be input to the terminal by the user on the basis of the abovementioned method, may also be a credential (for example, the SIM card) stored in the terminal after authorization of an operator or authorization of an identity authentication organization, and may further be acquired from another terminal which has passed authentication or another terminal which has accessed the mobile network (for example, a third terminal, not shown in FIG. 1).

The first terminal 11 may acquire the identity credential from the third terminal by sending an authorization request to the third terminal, the authorization request being configured to request to load the identity credential of the user, and when the authorization request is accepted, receives and loads the identity credential, sent by the third terminal, of the user. The authorization request sent to the third terminal by the first terminal 11 may include a fingerprint and/or a password and the like, and after the fingerprint and/or the password pass/passes verification, the third terminal sends the identity credential of the user to the first terminal 11.

It can be understood that the identity credential, sent to the first terminal 11 by the third terminal, of the user may be directly sent, and may also be encrypted by virtue of a key valid in a specific time range (for example, within 1 min). Specifically, the key may be a key derived according to the ID of the user and/or an ID of the terminal. The key may get invalid immediately after the identity credential of the user is completely sent. There are no limits made in the embodiment of the disclosure.

In addition, multiple transmission technologies, which may be, for example, technologies of Wireless Fidelity (WiFi), Bluetooth, Near Field Communication (NFC), Zigbee or wired connections of Universal Serial Bus (USB) 1.0, USB 2.0 and USB On-The-Go (OTG), may be adopted for the identity credential, sent to the first terminal 11 by the third terminal, of the user, which is not limited in the embodiment of the disclosure.

In S102, the first terminal 11 sends the generated first authentication request including the first identity credential to the SP device 12, and correspondingly, the SP device 12 receives the first authentication request sent by the first terminal 11.

Specifically, the first authentication request may further include an ID of the first terminal 11, which makes it convenient for the SP device 12 to feed back a verification result obtained after the identity credential is verified to the first terminal 11 on one hand and may further send corresponding data to the first terminal 11 according to the ID of the first terminal 11 on the other hand.

In S103, the SP device 12 determines an ID of the user and a priority of the first identity credential according to the first authentication request.

Alternatively, the SP device 12 may send the first authentication request to an identity authentication server, and when the identity authentication server accepts the first authentication request, receives the ID of the user and the priority of the first identity credential from the identity authentication server.

Alternatively, as an example, the identity authentication server may be constructed and maintained by an SP (for example, the operator). That is, different operators construct and maintain respective identity authentication servers respectively.

Alternatively, as another example, the identity authentication server may be constructed by a third party except the user and the operator. For example, the third party may be another third-party organization determined by negotiation. For example, the third party may be a government authority, that is, the identity authentication server may be constructed and maintained by the government authority. Therefore, security of the identity credential of the user may be ensured.

If the identity authentication server is constructed by the third party, the identity authentication server may be accessed by at least one operator. Here, for ensuring security of the identity credential of the user, rights of access of the operators to the identity authentication server may be set.

Alternatively, the SP device 12 may further determine the ID of the user and priority corresponding to the first identity credential according to a corresponding relationship prestored by it.

For example, the SP device 12 may pre-store part of corresponding relationships among IDs of users, identity credentials of the users (part of low-priority user credentials) and priorities of the identity credentials.

In such a manner, the SP device 12 may judge whether the part of corresponding relationships which are prestored exist on the SP device 12 or not at first. If the part of corresponding relationships are not stored on the SP device 12, or, if the SP device 12 may not determine the priority of the identity credential and the ID of the user according to the part of corresponding relationships, the first authentication request is sent to the identity authentication server for authentication. If the SP device 12 may determine the priority of the identity credential and the ID of the user according to the part of corresponding relationships, the SP device 12 may perform authentication according to the part of corresponding relationships. Therefore, user authentication efficiency may be improved.

It can be understood that, corresponding to the above two examples respectively, the corresponding relationship among the ID of the user, the identity credential of the user and the priority of the identity credential is stored in the SP device 12 or the identity authentication server.

For example, as shown in Table 1, if the identity credential received by the SP device 12 or the identity authentication server is DNA1, the SP device 12 or the identity authentication server may determine that a corresponding ID is ID1 and a corresponding priority is P1. That is, the first terminal 11 passes authentication at this moment.

TABLE 1

| Priority | P1 | P2 | P3 | P4 | P5 | ... | P9 |
|---|---|---|---|---|---|---|---|
| ID1 | DNA1 | Fingerprint 1 | Iris 1 | Voiceprint 1 | Certificate1 | ... | Password |

In S104, when passing authentication, the first terminal 11 receives context data, sent by the SP device 12 through a cloud service, of the user, and loads the context data of the user. Specifically, the SP device 12 may divide a space configured to store the context data for the user in data stored in own memory according to the ID of the user; or preferably, the operator may construct a cloud server configured to store context data generated in a service using process of each user. When the authentication request of the first terminal 11 is accepted, the operator sends the context data of the user to the first terminal 11 through the cloud service.

It can be understood that S104 is not necessary, and the first terminal 11 may further send a data request configured to request to load the context data of the user to the other terminal which has passed authentication or the other terminal which has accessed the mobile network (for example, the third terminal, not shown in FIG. 1), and when the data request is accepted, receives and loads the context data, sent by the third terminal, of the user. Alternatively, the data request may be verified in form of fingerprint and/or password.

It can be understood that the first terminal 11 may further receive the context data of the user from the third terminal through the technologies of WiFi, Bluetooth, NFC, Zigbee or wired connections of USB 1.0, USB 2.0 and USB OTG, etc.

It can be understood that the context data of the user includes at least one of a phonebook of the user, call records of the user, short message records of the user, browsing records of the user, data of Applications (APPs) used by the user, an account and password of the user and a User Interface (UI) used by the user.

It can be understood that the context data of the user is encrypted by virtue of a first key valid within a specific time range.

In such a manner, even though it is the first time for the user to use the first terminal 11 or it is not the first terminal 11 used for updating data last time, the user may also rapidly acquire own context data generated by the other terminal used last time, so that a perfect user experience may be provided for the user.

In S105, the SP device 12 enables a first service for the first terminal 11 according to the priority of the first identity credential in the first authentication request of the first terminal 11.

A corresponding relationship between a priority of an identity credential and an available service is stored in the SP device 12.

Specifically, services supported by the operator may be divided into different grades. For example, the grades of the service may be divided according to importance of the service, charges of the service or the like.

The operator may set identity credentials required by services of different grades. For example, the operator may set the following rules: 1, users may modify the service selected when registration only by highest-priority identity credentials (for example, DNA); and 2, users may use the international roaming call service only by second-priority identity credentials (for example, fingerprint).

The rules may be represented by the corresponding relationship between the priority of the identity credential and the available service. Moreover, the operator may pre-store the corresponding relationship in the SP device 12. Then, in S105, the SP device 12 may determine the corresponding service according to the corresponding relationship and enable the corresponding service for the terminal 11.

After S105, the user may access the network of the operator through the first terminal 11, and may use the service corresponding to the first identity credential.

In S106, when the user is also intended to use the second terminal 14 to access the mobile network to use the service provided by the mobile network, if one or more identity credentials (including a second identity credential of the user) of the user are stored in the first terminal 11, the second terminal 14 may send an authorization request configured to request to load the second identity credential of the user to the first terminal 11.

In S107, the first terminal 11 verifies whether the authorization request sent by the second terminal 14 may be accepted, and when the authorization request is accepted, the first terminal 11 sends the second identity credential to the second terminal 14.

It can be understood that specific implementation manners of S106 and S107 have been described in S101 and will not be elaborated herein. Moreover, S106 and S107 are also not necessary. The second identity credential of the second terminal 14 may also be input to the terminal by the user, and may further be originally stored in the terminal, which is not limited in the embodiment of the disclosure.

In S108, the second terminal 14 sends a second authentication request including the second identity credential to the SP device 12, and correspondingly, the SP device 12 receives the second authentication request sent by the second terminal 14.

In S109, the SP device 12 verifies the second authentication request, and determines the ID of the user and a priority of the second identity credential.

In S110, when the second authentication request is accepted, the second terminal 14 may send a data request configured to request to load the context data of the user to the first terminal 11 which has passed authentication and has accessed the mobile network, and when the data request is accepted, receives and loads the context data, sent by the first terminal 11, of the user. Alternatively, the data request may be verified in form of fingerprint and/or password.

Instead of S110, the second terminal 14 may receive the context data of the user from the SP device 12 through the cloud service.

In S111, the SP device 12 enables a second service for the second terminal according to the priority of the second identity credential in the second authentication request of the second terminal 14.

In the embodiment of the disclosure, the same user identity may simultaneously use multiple terminals (for example, the first terminal 11 and the second terminal 14), and the multiple terminals may be of the same type, and may also be of different types. For example, a user may simultaneously use two mobile phones, or use a tablet computer at the same time of using a mobile phone, wherein the mobile phone and the tablet computer belong to the same user ID when being used. One or more identity credentials of different grades may be stored in each terminal. Highest identity credential grades which may be stored and used by different types of terminals are different. For example, the highest identity credential grades stored and used by different types of terminals are progressively decreased according to a sequence of "fixed device>vehicle-mounted device>mobile phone>wearable device>monitoring device>sensor in a home".

It can be understood that, when the same user identity simultaneously uses multiple terminals, the different terminals may correspond to different services according to factors such as grades of identity credentials of the terminals, preferences of the user and capabilities of the terminals.

For example, the same user may simultaneously use multiple mobile phones, and the user may specify that one or more certain mobile phones are used for a voice communication service and the other mobile phones are used for a data service, wherein identity credentials of the user may be stored in each mobile phone, for example, credentials such as a SIM card may be stored in the mobile phones. Services available for each mobile phone may be limited by the user in a manner of setting identity credential grades.

For another example, the same user may simultaneously use a mobile phone and a tablet computer, the mobile phone may be used for the voice communication service and the data service, and due to a limit of a terminal capability, the tablet computer may only be used for the data service.

It can be understood that, when the terminal in the embodiment of the disclosure is a low-cost terminal (for example, a sensor), there may exist a very large number of such terminals in the mobile network. The low-cost terminal usually does not have any high-cost, large-size and high-power-consumption part such as a SIM card and a fingerprint recognition part, and due to its simple functions, data generated by it usually also does not involve any high-level user privacy. Therefore, the low-cost terminal may not require frequent authentication, and a specific authentication manner may be adopted for loading of a required identity credential.

Alternatively, a manufacturer may customize and preload the identity credential for the user when the terminal is delivered, that is, the identity credential of the user using the terminal is preloaded in the terminal.

Alternatively, the SP may provide the identity credential of the user for the terminal during subscription between the terminal and the SP, and the identity credential may be loaded through a specific programming interface or hardware (for example, an Integrated Circuit (IC) card).

Alternatively, the user may independently load authorization information. For example, after the terminal is turned on, if there exists no identity credential (valid) in the terminal, or the terminal is set into an identity credential loading mode through a specific operation, the user may load the identity credential.

For example, the user may send the identity credential through own communication network (for example, a Wireless Local Area Network (WLAN)) in a broadcast manner, and the terminal receives and stores it. The user may also load it in the terminal without the identity credential through another terminal which has stored the identity credential (for example, a mobile phone) by virtue of a short-range radio technology such as NFC and Bluetooth. The user may further load it in the terminal without the identity credential by virtue of a data line, a memory card and the like.

In S112, when the user is not intended to use the service provided by the mobile terminal through the first terminal 11, the user may send a deauthentication request configured to request the SP device 12 to stop providing the first service for the first terminal 11 to the SP device 12 through a related system or APP of the first terminal 11.

In S113, when stopping providing the first service for the first terminal, the SP device 12 calculates traffic and/or charge spent by the first terminal 11 on the first service, that is, the SP device 12 performs charging according to a usage condition of the user for the first service.

Specifically, different charging manners may be adopted for different service types, for example, session based charging, duration based charging, used network resource (for example, traffic) based charging and used resource type based charging. There are no limits made in the disclosure.

Wherein, used resource type based charging may include that: charges of priority resources (for example, emergency calls) are relatively high; a charging manner for a resource of a broadcast type is different from a charging manner for a resource of a unicast type; and the like.

Alternatively, the SP device 12 may perform charging through a charging control device, a Policy and Charging Enforcement Function (PCEF), a Policy and Charging Rules Function (PCRF) and the like.

Alternatively, the user may set a charging account corresponding to the ID of the user in a unified charging server, wherein the ID of the user corresponds to the charging account one to one. In such a manner, different operators may all use the charging account, so that overhead of the user may be reduced, payment pressure of the user is reduced, and troubles brought by service suspension due to the fact that the user forgets to pay are avoided.

Specifically, the SP device 12 may send a charging request to the unified charging server, the charging request including the ID, and the unified charging server charges the charging account of the user.

In S114, the first terminal 11 is stopped to use the first service, and may delete the context data of the user and/or identity credential of the user stored by it to ensure security of the user data.

In the embodiment of the disclosure, the operator divides the service provided by it into different grades, and the user may use the corresponding service by virtue of the corresponding identity credentials. When the user uses the terminal, the context data may be loaded through the cloud service or the other terminal, so that a seamless service experience may be provided for the user. Moreover, the user may simultaneously use multiple terminals with one identity to access the same SP, so that flexibility of use of the user over the corresponding service may be improved.

Figure 2:
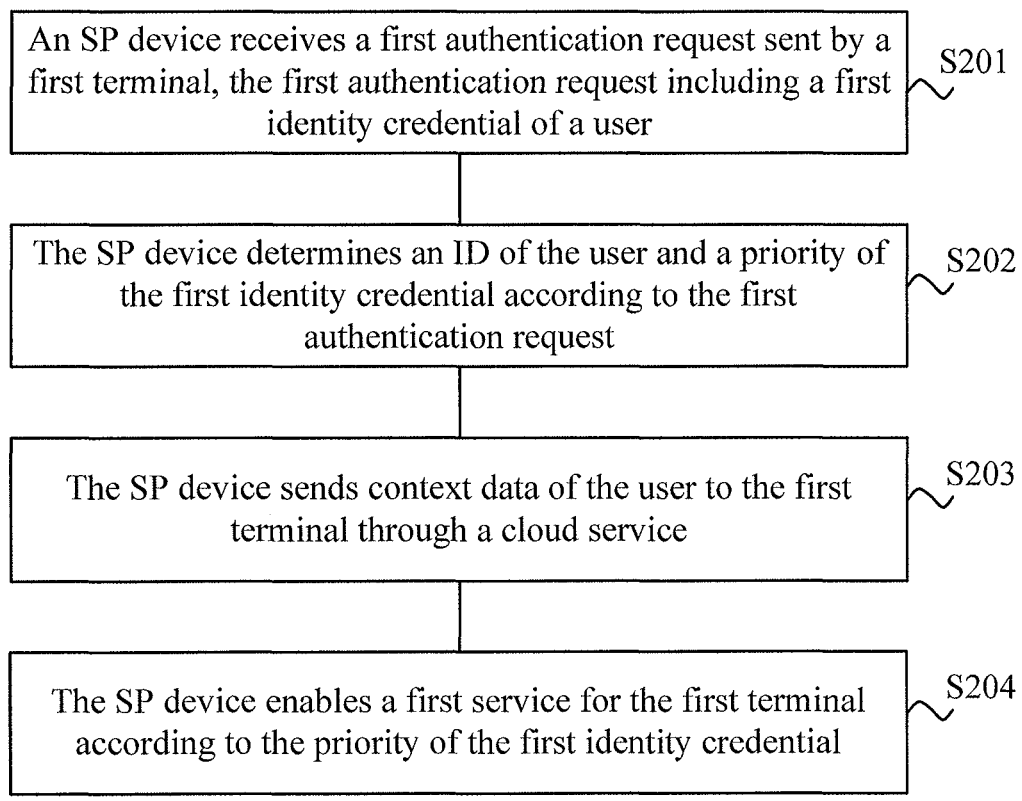
FIG. 2 illustrates a schematic flowchart of a terminal authentication method according to another embodiment of the disclosure.

FIG. 2 illustrates a schematic flowchart of a terminal authentication method 200 according to another embodiment of the disclosure. The method shown in FIG. 2 is executed by an SP device, and includes the following steps.

In S201, the SP device receives a first authentication request sent by a first terminal, the first authentication request including a first identity credential of a user.

In S202, the SP device determines an ID of the user and a priority of the first identity credential according to the first authentication request.

In S203, the SP device sends context data of the user to the first terminal through a cloud service.

In S204, the SP device enables a first service for the first terminal according to the priority of the first identity credential.

In the embodiment of the disclosure, the SP device loads the context data of the user for the terminal according to the identity credential, sent by the terminal, of the user, and provides the corresponding service. In such a manner, a unified security identity authentication manner may be implemented, a seamless user experience may be provided for the user, usability may be improved, and optimal utilization of resources may also be implemented.

In the embodiment of the disclosure, the first identity credential of the user may include a primary credential or a secondary credential. A priority of the primary credential is higher than a priority of the secondary credential.

Wherein, the primary credential includes at least one of: a DNA, a fingerprint, an iris and a voiceprint. Wherein, the secondary credential includes at least one of: a digital certificate, a digital signature, a user card and a password.

In the embodiment of the disclosure, the first identity credential may be provided for the first terminal by an SP during subscription between the first terminal and the SP, and the first identity credential may be loaded through a specific programming interface or hardware.

In the embodiment of the disclosure, the first identity credential may be provided for the first terminal by a terminal which has passed authentication. In the embodiment of the disclosure, a priority sequence may be set for various different identity credentials, which may specifically refer to descriptions about the priorities in the embodiment shown in FIG. 1 and will not be elaborated herein.

Alternatively, in S202, the SP device may determine the ID and priority corresponding to the first identity credential according to a pre-stored corresponding relationship.

Alternatively, as another embodiment, in S202, the SP device may send the first authentication request to an identity authentication server and receive the ID and priority of the first identity credential sent by the identity authentication server.

Wherein, the first identity credential in the first authentication request may be an identity credential generated after processing of the terminal with a generation method.

In the embodiment of the disclosure, the context data of the user may include at least one of a phonebook of the user, call records of the user, short message records of the user, browsing records of the user, data of APPs used by the user, an account and password of the user and a UI used by the user.

Alternatively, as an embodiment, in S203, the SP device may encrypt the context data of the user by virtue of a key valid in a specific time range and send the encrypted context data of the user to the first terminal through the cloud service.

Alternatively, as an embodiment, the key gets invalid after the context data of the user is completely sent.

Alternatively, as an embodiment, the key is a key derived according to at least one of the ID of the user and an ID of the first terminal. Alternatively, as an embodiment, in S204, the SP device may determine the service corresponding to the priority of the first identity credential, wherein different priorities correspond to different services, and a service corresponding to a high priority includes services corresponding to low priorities; and the first service corresponding to the priority of the first identity credential is enabled for the first terminal.

It can be understood that a corresponding relationship between a priority and a service may be stored in the SP device. Specifically, S204 may refer to the descriptions about S105 in the embodiment shown in FIG. 1, and will not be elaborated for avoiding repetition.

Furthermore, after S204, the method 200 further includes that:

the SP device receives a second authentication request sent by a second terminal, the second authentication request including a second identity credential of the user;

the SP device determines the ID of the user and a priority of the second identity credential according to the second authentication request;

the SP device sends the context data of the user to the second terminal through the cloud service; and the SP device enables a second service for the second terminal according to the priority of the second identity credential.

Specifically, the same user may simultaneously use multiple terminals to accept a service of the same SP device. A using process may refer to the descriptions about S106 to S111 in the embodiment shown in FIG. 1, and will not be elaborated herein for avoiding repetition. Alternatively, the priority of the first identity credential is different from the priority of the second identity credential, and correspondingly, the first service is different from the second service.

Alternatively, as an embodiment, the method 200 may further include that: the SP device performs charging according to a usage condition of the user for the first service and the second service.

Specifically, the SP device may send a charging request to a unified charging server to enable the unified charging server to charge a charging account of the user, wherein the charging request includes the ID, and the charging account corresponds to the ID one to one.

Here, the charging account may be preset in the unified charging server by the user, and the charging account may be accessed by an SP device of multiple operators respectively. Charges spent by multiple terminals in respective use of the service provided by the SP device may be deducted from the charging account corresponding to the same ID.

Alternatively, as an embodiment, the method 200 may further include that: the SP device receives a deauthentication request sent by the first terminal, the deauthentication request being configured to request the SP device to stop providing the first service for the first terminal, and the SP device stops providing the first service for the first terminal.

Specifically, when stopping providing the first service for the first terminal, the SP device performs charging according to the usage condition of the user for the first service. Specifically, processing during deauthentication may refer to the descriptions about S112 to S114 in the embodiment shown in FIG. 1, and will not be elaborated herein for avoiding repetition.

It can be understood that each step of the method 200 may refer to the descriptions about the corresponding step in the embodiment shown in FIG. 1, and will not be elaborated herein for avoiding repetition.

Figure 3:
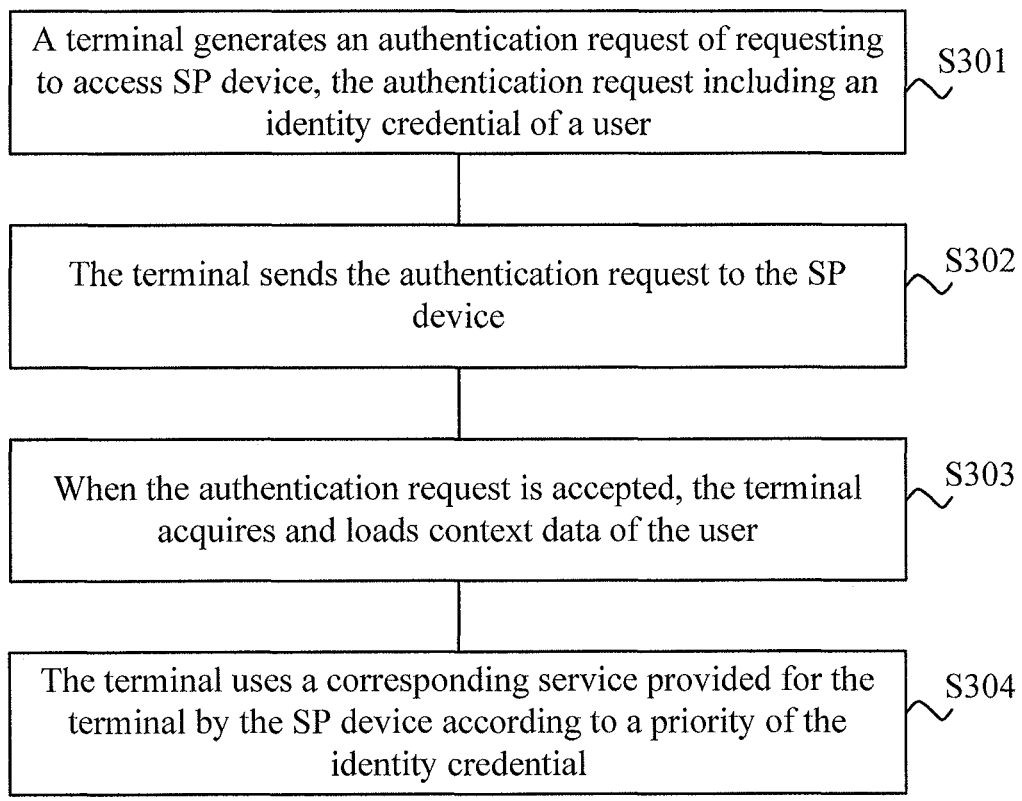
FIG. 3 illustrates a schematic flowchart of a terminal authentication method according to another embodiment of the disclosure.

FIG. 3 illustrates a schematic flowchart of a terminal authentication method 300 according to another embodiment of the disclosure. The method shown in FIG. 3 is executed by a terminal, and includes the following steps.

In S301, the terminal generates an authentication request of requesting to access an SP device, the authentication request including an identity credential of a user.

In S302, the terminal sends the authentication request to the SP device.

In S303, when the authentication request is accepted, the terminal acquires and loads context data of the user.

In S304, the terminal uses a corresponding service provided for the terminal by the SP device according to a priority of the identity credential.

In the embodiment of the disclosure, the terminal is subjected to identity authentication of the SP device according to the identity credential of the user, and acquires and loads the context data of the user, and the SP device may provide the corresponding service for the user. In such a manner, a unified security identity authentication manner may be implemented, a seamless user experience may be provided for the user, usability may be improved, and optimal utilization of resources may also be implemented.

In the embodiment of the disclosure, the identity credential of the user may include a primary credential and a secondary credential. A priority of the primary credential is higher than a priority of the secondary credential.

Wherein, the primary credential includes at least one of: a DNA, a fingerprint, an iris and a voiceprint. Wherein, the secondary credential includes at least one of: a digital certificate, a digital signature, a user card and a password.

Alternatively, as an embodiment, the identity credential of the user is input into the terminal by the user.

Alternatively, as an embodiment, the identity credential of the user may be provided for the terminal by an SP during subscription between the terminal and the SP, and the identity credential may be loaded through a specific programming interface or hardware.

Alternatively, as another embodiment, the identity credential of the user may be acquired in the following manner: a first authorization request is sent to a third terminal, the first authorization request being configured to request to load the identity credential of the user; and when the first authorization request is accepted, the identity credential, sent by the third terminal, of the user is received and loaded, wherein the terminal may receive the identity credential from a second terminal through WiFi, Bluetooth, an NFC technology, Zigbee or a wired connection.

In addition, the identity credential of the user may be stored in the terminal, and the method 300 further includes that: the terminal receives a second authorization request sent by a fourth terminal, the second authorization request being configured to request to load the identity credential of the user; the terminal verifies whether the second authorization request is accepted; and when the second authorization request is accepted, the terminal sends the identity credential of the user to the fourth terminal.

In the embodiment of the disclosure, the identity credential of the user may be encrypted by virtue of a second key valid in a specific time range.

Alternatively, as another embodiment, the second key gets invalid after the identity credential of the user is completely sent.

Alternatively, as another embodiment, the second key is a key derived according to an ID of the user and/or an ID of the terminal. In the embodiment of the disclosure, a priority sequence may be set for various different identity credentials, which may specifically refer to descriptions about the priorities in the embodiment shown in FIG. 1 and will not be elaborated herein.

Alternatively, in S303, the terminal may receive the context data, sent to the terminal by the SP device through a cloud service, of the user, and load the context data of the user.

Alternatively, as another embodiment, in S303, the terminal may send a first data request to a first terminal, the first data request being configured to request to load the context data of the user, and when the first data request is accepted, receives and loads the context data, sent by the first terminal, of the user.

In the embodiment of the disclosure, the context data of the user may include at least one of a phonebook of the user, call records of the user, short message records of the user, browsing records of the user, data of APPs used by the user, an account and password of the user and a UI used by the user.

The context data of the user may be encrypted by virtue of a first key valid in a specific time range, wherein the first key may get invalid after the context data of the user is completely sent. The first key may be a key derived according to the ID of the user and/or the ID of the first terminal, wherein the terminal may receive the context data, sent by the first terminal, of the user through WiFi, Bluetooth, an NFC technology, Zigbee or a wired connection.

In the embodiment of the disclosure, the terminal may request for deauthentication. Specifically, the terminal sends a deauthentication request to the SP device, the deauthentication request being configured to request the SP device to stop providing the corresponding service for the terminal, and the terminal deletes the loaded context data of the user.

It can be understood that each step of the method 300 may refer to the descriptions about the corresponding steps in the embodiment shown in FIG. 1 and will not be elaborated herein for avoiding repetition.

Figure 4:
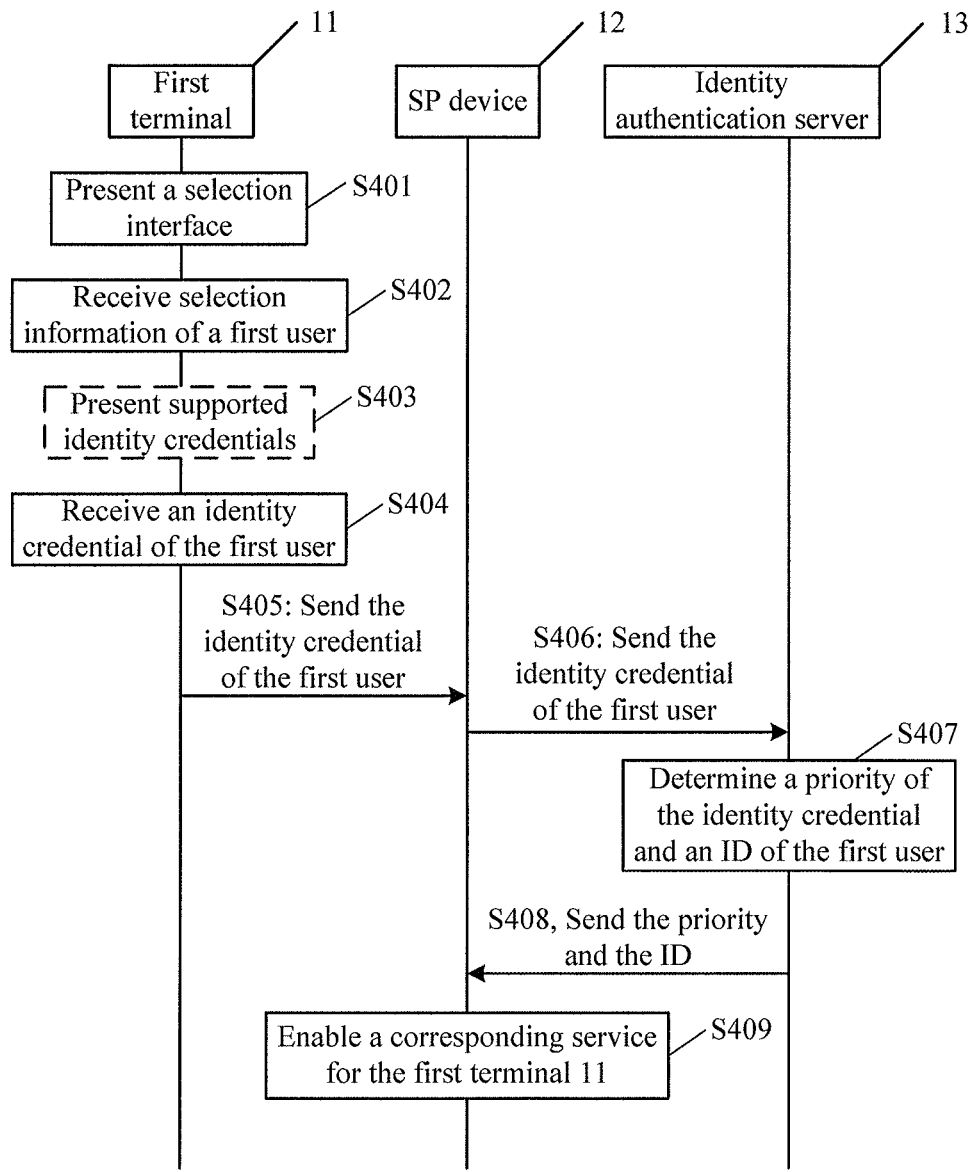
FIG. 4 illustrates a schematic flowchart of a user identity authentication method according to an embodiment of the disclosure.

A method for identity authentication over a user of a first terminal 11 involved in FIG. 1 will be introduced below in combination with FIG. 4 to FIG. 6 in detail. FIG. 4 is a flowchart of a user identity authentication method according to an embodiment of the disclosure. In FIG. 4, a first terminal 11, an SP device 12 and an identity authentication server 13 are shown.

In the embodiment of the disclosure, there is made such a hypothesis that the first terminal 11 is not in a service state in an initial state, that is, no user uses the first terminal 11 to access a mobile network. Or, the first terminal 11 is in a factory set state, or a first user uses the first terminal 11 for the first time.

In S401, when a first user plans to use the first terminal 11, the first terminal 11 presents a selection interface configured for the first user to select an operator.

Figure 5:
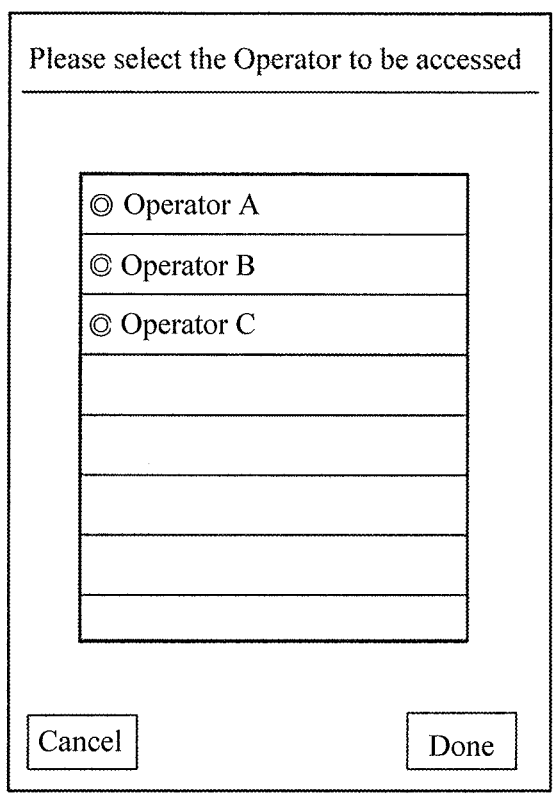
FIG. 5 illustrates a schematic diagram of a selection interface presented on a terminal according to an embodiment of the disclosure.

For example, the interface of the first terminal 11 may display a first list (one example is shown in FIG. 5), and multiple operators are listed in the first list (an operator A, an operator B and an operator C are shown in FIG. 5).

In S402, the first terminal 11 receives selection information input by the first user, the selection information indicating the operator selected by the first user.

Specifically, the first user may select at least one operator from the selection interface presented in S401.

For example, the selection information may be that the first user selects the operator A shown in FIG. 5 and clicks a "Done" button.

For example, the selection information may also be that the first user selects the operator A and the operator C shown in FIG. 5 and clicks the "Done" button.

In S403, the first terminal 11 presents a supported identity credential list.

In the embodiment of the disclosure, an identity credential is a characteristic of an identity of a user. The identity credential may include a primary credential and a secondary credential, wherein the primary credential may include at least one of: a DNA, a fingerprint, an iris, a voiceprint and the like; and the secondary credential may include at least one of: a digital certificate, a digital signature, a user card, a password and the like. Moreover, the identity credential may implement identity binding authentication with another certificate, wherein the other certificate may be, for example, a certificate issued by an authority. For example, the certificate issued by the authority may be an identity card number or a passport number. In the embodiment of the disclosure, the other certificate may be determined as an ID of the first user.

In the embodiment of the disclosure, different identity credentials may have different priorities. A priority of a primary credential is higher than a priority of a secondary credential. Moreover, specifically, the DNA may be determined to have a highest priority, the fingerprint has a second priority, the iris has a third priority, the voiceprint has a fourth priority, . . . , and the password has a lowest priority.

Here, the DNA may be determined by collecting blood, saliva or the like. The fingerprint may be fingerprint information of multiple fingers or fingerprint information of one finger, or may be part of fingerprint information of a finger. Moreover, a priority of fingers of multiple fingers may be higher than a priority of a fingerprint of one finger. The iris may be irises of double eyes or a single eye.

For example, the user card may be a SIM card. The password may be a long character string or a short character string, or may also be a sequence of motions on a figure.

It should be understood that, due to hardware differences of different terminals, different user credentials may be supported to be input. For example, some terminals may acquire iris information of users through cameras, and some terminals may acquire fingerprint information of users through specific regions. Some terminal will also collect blood, *salvia* or the like for DNA recognition in a specific manner in the future.

Therefore, the user credential list presented by the first terminal 11 in S403 is related to a hardware attribute and the like of the first terminal 11.

It is to be noted that, in the embodiment of the disclosure, Step S403 is not necessary but optional. For example, the first terminal 11 is owned by the first user, and may be used by another user only after agreement or authorization of the first user. Moreover, the first user has been quite familiar with an attribute (and a corresponding service) of the first terminal 11, so that the first user may set the first terminal 11 to no longer present the supported identity credential list.

In S404, the first terminal 11 receives an identity credential input by the first user.

For example, the first user may input a password through a keyboard or touch screen of the first terminal 11. Or, the first user may input a fingerprint through a fingerprint acquisition module of the first terminal 11. Or, the first user may input an iris through a camera of the first terminal 11. Or, the first user may input a voiceprint through a microphone, etc.

In the embodiment of the disclosure, the first terminal 11 is not limited to be used by only one user, that is, multiple users may access the mobile network through the first terminal 11. Then, the first terminal 11 may allocate respectively independent storage regions for different users. For example, there may be multiple physically or logically independent storage regions in the first terminal 11, configured to store information of different users respectively.

Specifically, the first terminal 11 may allocate a first storage region for the first user to store the identity credential of the first user and, after authentication succeeds, store user data (including a UI), service information and the like of the first user.

In S405, the first terminal 11 sends the identity credential of the first user to the SP device 12.

It can be understood that the SP device 12 is an SP device of the operator selected by the first user in S402.

For example, if the operator selected by the first user in S402 is the operator A, the SP device 12 is SP device of the operator A. For example, if the operators selected by the first user in S402 are the operator A and the operator B, the SP device 12 includes the SP device of the operator A and SP device of the operator B.

Alternatively, if a priority of the identity credential of the first user is relatively high, for example, the DNA or the iris, the first terminal 11 may process the identity credential of the first user by adopting a generation method, and then sends the processed identity credential to the SP device 12. That is, the first terminal 11 does not directly transmit original data of the identity credential such as the DNA, fingerprint, iris and voiceprint of the user, and instead, transmits data generated after processing with a certain generation method (for example, a certain one-way mapping algorithm is used). Therefore, the user may protect own privacy from being illegally acquired by the operator or another third party (for example, a hacker) intercepting the transmitted data.

Here, the generation method may be understood as an encryption method. Moreover, a low-priority form may be generated after the generation method is adopted. For example, for the DNA, a character string with a length of 30 may be generated after processing with the generation method. For the fingerprint, a character string with a length of 25 may be generated after processing with the generation method.

In S406, the SP device 12 sends the identity credential of the first user to the identity authentication server 13.

Alternatively, as an example, the identity authentication server 13 may be constructed and maintained by an SP (for example, the operator). That is, different operators construct and maintain respective identity authentication servers respectively.

Alternatively, as another example, the identity authentication server 13 may be constructed by a third party except the user and the operator. For example, the third party may be another third-party organization determined by negotiation. For example, the third party may be a government authority, that is, the identity authentication server 13 may be constructed and maintained by the government authority. Therefore, security of the identity credential of the user may be ensured.

If the identity authentication server 13 is constructed by the third party, the identity authentication server 13 may be accessed by at least one operator. Here, for ensuring security of the identity credential of the user, rights of access of the operators to the identity authentication server 13 may be set.

Alternatively, in S406, the SP device 12 may reprocess the identity credential of the first user for sending to the identity authentication server 13, for example, addition of own digital signature or encryption. Therefore, not only may a source of a message be indicated to the identity authentication server 13, but also security communication between the SP device 12 and the identity authentication server 13 may be ensured. It can be understood that the digital signature, encryption method or the like used by the SP device 12 is predetermined by the SP device 12 and the identity authentication server 13.

It can be understood that, if the SP device 12 receives the identity credential generated after processing with the generation method from the first terminal 11 in S405, the SP device 12 may also send the identity credential generated after processing with the generation method to the identity authentication server 13 in S406. Or, in S406, the SP device may reprocess (own digital signature addition or encryption) the identity credential generated after processing with the generation method for sending to the identity authentication server 13. The SP device 12 does not know the generation method adopted by the first terminal 11, or, the SP device 12 does not know a key configured for encryption even though knowing the generation method, so that the SP device 12 cannot perform a decryption operation, and the SP device 12 cannot acquire the high-priority identity credential of the first user. Therefore, security of the identity credential may be improved.

For example, the identity credential input into the first terminal 11 by the first user is DNA characteristic information, and the processed identity credential acquired by the SP device 12 from the first terminal 11 is a character string with a length of 30. Correspondingly, the SP device 12 sends the character string with the length of 30 to the identity authentication server 13, or the SP device 12 reprocesses the character string with the length of 30 for sending to the identity authentication server 13.

In S407, the identity authentication server 13 determines an ID, corresponding to the identity credential, of the first user and a priority of the identity credential according to the identity credential of the first user.

Wherein, the ID of the first user may be a certificate issued by the authority, and for example, may be an identity card number or passport number of the first user.

In the embodiment of the disclosure, a corresponding relationship among an ID of a user, an identity credential of the user and a priority of the identity credential is stored in the identity authentication server 13. That is, information of identity binding authentication between the identity credential and the other certificate is stored in the identity authentication server 13.

For example, as shown in Table 1, if the identity credential received by the identity authentication server 13 in S406 is DNA1, the identity authentication server 13 may determine that a corresponding ID is ID1 and a corresponding priority is P1.

If the identity authentication server 13 receives the processed identity credential (identity credential generated by the first terminal 11 after processing with the generation method), in S407, the identity authentication server 13 may recover the identity credential by adopting a verification method at first and then determine the corresponding priority and ID of the user. It can be understood that the verification method is a decryption method. Moreover, the SP device 12 cannot acquire the verification method.

It can be understood that, in the embodiment of the disclosure, the generation method and the verification method are predetermined by the first terminal 11 and the identity authentication server 13. For example, the generation method may be included by factory settings of the first terminal 11.

Alternatively, in another embodiment, if the identity authentication server 13 receives no original data of the identity credential such as the DNA, the fingerprint, the voiceprint and the iris but a sequence obtained by the first terminal 11 after processing with the generation method, the identity authentication server 13 may determine the ID of the user and the priority of the identity credential according to the characteristic sequence generated after processing with the generation method. For example, the generation method may also be stored in the identity authentication server 13. The identity authentication server 13 may generate a characteristic sequence for the original data of the DNA, the fingerprint, the voiceprint, the iris and the like by adopting the generation method. Then, the identity authentication server 13 may compare the characteristic sequence with the received sequence, thereby determining the priority of the received identity credential and the ID of the corresponding user.

In addition, in the embodiment of the disclosure, the identity authentication server 13 may acquire the identity credential of the user from a specific part, or, the user may also actively upload the identity credential. If the identity authentication server 13 is constructed and maintained by the government authority, the government authority may acquire a corresponding relationship between a fingerprint and identity card number/passport number of a user and the like from the public security department, and may acquire a corresponding relationship between a DNA and iris characteristic information and identity card number/passport number of a user and the like from a specific hospital, and the user may upload the user card, the password and the like.

In S408, the identity authentication server 13 sends the priority of the identity credential and the ID of the first user to the SP device 12.

In such a manner, the SP device 12 may acquire registration information of the user according to the ID of the first user, wherein the registration information may also be called as subscription information.

It can be understood that the first user may use a service provided by the operator only after being registered in the operator. Before the embodiment of the disclosure, the first user has completed a subscription service in the operator. For example, during subscription, the first user may select at least one kind of service provided by the operator, and may set a user credential required by the at least one kind of service. For example, the first user may select or not select the international roaming service. The first user may make an agreement with the operator on that a user credential required by the international roaming service is a fingerprint.

In S409, the SP device 12 enables a corresponding service for the first terminal 11.

A corresponding relationship between a priority of an identity credential and an available service is stored in the SP device 12, wherein the corresponding relationship may also be understood as the subscription information.

For example, the corresponding relationship may include that: service corresponding to the password includes part of calls; service corresponding to the user card includes short messages and all the calls; . . . , service corresponding to the fingerprint includes the shortcomings, all the calls and network traffic under a certain threshold value; . . . , service corresponding to the DNA includes all available service, etc. They will not be listed here one by one.

That is, the user may use the corresponding service only after inputting the corresponding or higher-priority identity credential. If the priority of the identity credential input by the user is lower than the priority of the identity credential corresponding to the service, the first terminal 11 may deny the user to use the service.

Specifically, after S408, the SP device 12 may acquire the subscription information of the first user according to the ID of the first user, and furthermore, may determine the service corresponding to the priority of the identity credential according to the subscription information, thereby enabling the corresponding service for the first terminal 11 used by the first user in S409.

Specifically, services supported by the operator may be divided into different grades. For example, the grades of the services may be divided according to importance of the services, charges of the services or the like.

The operator may set identity credentials required by services of different grades. For example, the operator may set the following rules: 1, users may modify the service selected when registration only by highest-priority identity credentials (for example, DNA); and 2, users may use the international roaming call service only by second-priority identity credentials (for example, fingerprint).

The rules may be represented by the corresponding relationship between the priority of the identity credential and the available service. Moreover, the operator may pre-store the corresponding relationship in the SP device 12. Then, in S409, the SP device 12 may determine the corresponding service according to the corresponding relationship and enable the corresponding service for the first terminal 11.

Alternatively, after S408, the SP device 12 may also send the priority of the identity credential and the ID of the first user to the first terminal 11 (not shown in FIG. 4), and then the first terminal 11 may store a corresponding relationship among the identity credential, the priority of the identity credential and the ID of the first user, and may specifically store it in the first storage region.

After S409, the first user may access the network of the operator through the first terminal 11, and may use the service corresponding to the identity credential input by the first user.

It can be understood that, in such a process, the first user may use the service enabled in S409. If the first user is intended to use another service except the enabled service, the first terminal 11 may display a denial alarm or prompt the first user that a high-priority identity credential is required to be input.

For example, there is made such a hypothesis that the identity credential input by the first user in S404 is a password and the service enabled in S409 includes local call. If the first user is intended to use international roaming call, the first terminal 11 may present an alarm interface to deny an international roaming call service request of the first user; or, the first terminal 11 may present an indication information interface to indicate the first user that the high-priority identity credential "fingerprint" is required to be input to use the service.

Alternatively, as an embodiment, information of priorities of part of user credentials may be prestored in the SP device 12. For example, part of corresponding relationships among IDs of users, identity credentials of the users (part of low-priority user credentials) and priorities of the identity credentials may be prestored.

Then, after S405, the SP device 12 may judge whether the part of corresponding relationships which are prestored exist on the SP device 12 or not at first. If the part of corresponding relationships are not stored on the SP device 12, or, if the SP device 12 may not determine the priority of the identity credential and the ID of the user according to the part of corresponding relationships, S406 is continued to be executed after S405.

If the SP device 12 may determine the priority of the identity credential and the ID of the user according to the part of corresponding relationships, after S405, the SP device 12 may perform authentication according to the part of corresponding relationships, and S409 is directly executed after authentication (that is, S406 to S408 are not required to be executed). Therefore, user authentication efficiency may be improved.

In the embodiment of the disclosure, if the operator where the SP device 12 is located is the operator A. After S409, the first user accesses the network of the operator A through the first terminal 11, and may use the service provided by the operator A through the first terminal 11.

The process may further include that: the SP device 12 performs charging according to a service usage condition of the first user. Specifically, different charging manners may be adopted for different service types, for example, session based charging, duration based charging, used network resource (for example, traffic) based charging and used resource type based charging. There are no limits made in the disclosure.

Wherein, used resource type based charging may include that: charges of priority resources (for example, emergency calls) are relatively high; a charging manner for a resource of a broadcast type is different from a charging manner for a resource of a unicast type; and the like.

Alternatively, the SP device 12 may perform charging through a charging control device, a PCEF, a PCRF and the like.

Alternatively, the user may set a charging account corresponding to the ID of the user in a unified charging server, wherein the ID of the user corresponds to the charging account one to one. In such a manner, different operators may all use the charging account, so that overhead of the user may be reduced, payment pressure of the user is reduced, and troubles brought by service suspension due to the fact that the user forgets to pay are avoided.

Specifically, the SP device 12 may send a charging request to the unified charging server, the charging request including the ID, and the unified charging server charges the charging account of the user.

Furthermore, in the process, if the first user is intended to use a service of another operator (for example, the operator B), at this moment, after the method shown in FIG. 4, the following steps (not shown in FIG. 4) may further be included.

In S410, the first terminal 11 receives a specific instruction of the first user, the specific instruction indicating that an operator is required to be reselected.

Specifically, the first user may reselect the operator through a specific button of the first terminal 11. For example, the first user may cause the first terminal 11 to display an interface shown in FIG. 5 through a specific menu of the first terminal 11. That is, after S410, S401 and S402 may be executed. There is made such a hypothesis that the operator reselected by the first user in S402 is the operator B.

For example, if a certain service S1 is only provided by the operator B or the service S1 is included only during subscription between the first user and the operator B, after S409, if the first user is intended to use the service S1, the first terminal 11 may prompt denial alarm information. At this moment, S410 may be executed, that is, the first user may reselect the operator through the first terminal 11.

In the embodiment of the disclosure, after S409, the first user may set operators connected with some service in a "service setting" menu of the first terminal 11 in a service using process. Moreover, such information may be stored in the first storage region of the first terminal 11, and then the first user may subsequently use some service by virtue of this setting. For example, the first user may set a sequence of operators used by the service S1 to be: the operator B, the operator A and the operator C. Then, the service S1 preferably uses the operator B, uses the operator A only when the operating B is failed to be connected (for example, no signals), and uses the operator C only when the operator B and the operator A are both failed to be connect. For example, the first user may set a sequence of operators used by a service S2 to be: the operator A and the operator C.

Thus it can be seen that, in a process of using the first terminal 11 by the first user, different services may be provided by different operators. That is, the first user may simultaneously use services provided by multiple operators.

In S411, the first terminal 11 sends the identity credential of the first user to an SP device of an operator B.

It can be understood that the identity credential of the first user is acquired by the first terminal 11 in S404, and is stored in the first storage region of the first terminal 11. Or, the identity credential of the first user may be reinput by the first user after S410. For example, if the identity credential required by the service S1 only provided by the operator is the DNA, before S411, the first user may input the DNA.

Thereafter, the SP device of the operator B may execute a process similar to the SP device 12, which will not be elaborated herein.

Alternatively, as an example, after the abovementioned method, the following operation may further be included: the first terminal 11 receives a temporary quitting instruction of the first user. The temporary quitting instruction indicates that the first user temporarily no longer uses the first terminal 11 and the related information of the first user is required to be temporarily suspended. Then, the first terminal 11 may suspend the user data of the first user according to the temporary quitting instruction. That is the user data of the first user is in an inactive state, wherein the user data may include a profile of the user, an APP of the user, a UI of the user and the like.

When the first user is subsequently required to continue using the first terminal 11, the first user may input an activation instruction. That is, the first terminal 11 may receive the activation instruction of the first user and activate the suspended user data of the first user. Specifically, the first terminal 11 may load the profile of the first user according to the activated user data and present the UI of the first user, wherein the UI may present APP information of the first user.

Figure 6:
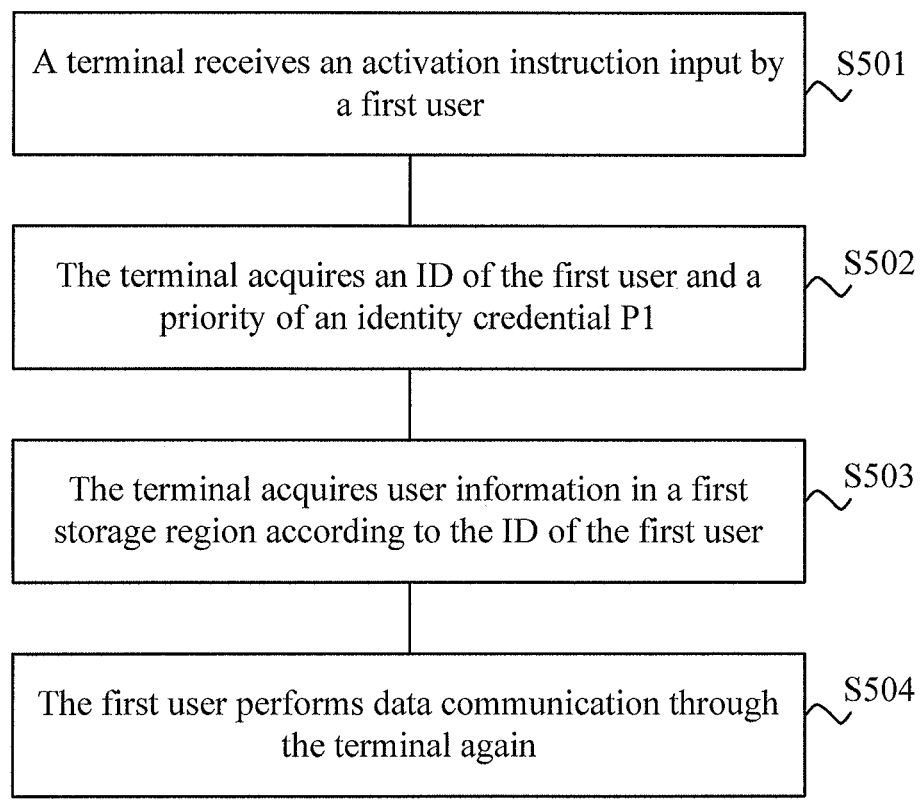
FIG. 6 illustrates a schematic flowchart of a user identity authentication method according to another embodiment of the disclosure.

When the user uses the first terminal 11 suspended by the first user through the temporary quitting instruction again, as shown in FIG. 6, the following steps may be included.

In S501, a first terminal 11 receives an activation instruction input by a first user, wherein, the activation instruction may be an identity credential of the first user, for example, an identity credential P1.

In S502, the first terminal 11 acquires an ID of the first user and a priority of the identity credential P1.

Alternatively, if information of the identity credential P1 of the first user is stored in the first terminal 11, in S502, the first terminal 11 may determine the ID of the first user and the priority of the input identity credential P1 according to the stored information.

For example, if related information is stored in a first storage region of the first terminal 11, the first terminal 11 may autonomously determine the ID of the first user and the priority of the input identity credential P1.

Alternatively, if the information of the identity credential P1 of the first user is not stored in the first terminal 11 (for example, only information of an identity credential P2 is stored in the first terminal 11), the first terminal 11 may execute Step S405 and acquire the ID of the first user and the priority of the identity credential P1 from an SP device after S501. Specific descriptions are as mentioned above, and will not be elaborated herein.

In S503, the first terminal 11 acquires user information in a first storage region according to the ID of the first user.

Here, the first storage region is, as mentioned above, an independent storage region allocated for the first user by the first terminal 11.

Specifically, in S503, the first terminal 11 presents a UI, stored in the first storage region, of the first user, and the UI may display an APP and the like of the first user.

In S504, the first user performs data communication again through the first terminal 11.

In addition, if the first user sets a sequence of providers (or operators) used by a service through a "service setting" menu after S409, the first user may directly use the service according to setting made before in S504.

Alternatively, there is made such a hypothesis that the first user is intended to use a service S2 and an identity credential required by the service S2 is P2. If the priority of the identity credential P1 input by the first user in S501 is lower than a priority of the identity credential P2, the first terminal 11 may deny the first user to use the service S2. Or, the first terminal 11 may present a notification message to cause the first user to input the identity credential P2. Or, the first terminal 11 may present a selection interface to cause the user to decide whether to send the identity credential P2 stored in the first storage region (if being stored) to an SP device of an operator providing the service S2. There are no limits made in the disclosure.

Alternatively, as another example, after the abovementioned method (after S409 or after S504), the following operation may further be included: the first terminal 11 receives a permanent deactivation instruction of the first user. Then, the first terminal 11 may delete user data of the first user according to the permanent deactivation instruction. That is, the first terminal 11 may delete all the information in the first storage region according to the permanent deactivation instruction.

It can be understood that, thereafter, if the first user uses the first terminal 11 again, a process is the same as the flow when the first user uses the first terminal 11 for the first time, and will not be elaborated herein.

For example, if the first user uses a public device in a certain public place (for example, a library and an internet bar), after use, a permanent deactivation instruction may be input and personal data may be timely cleared, so that security of the user data may be ensured.

It can be understood that, after the first user temporarily quits or permanently deactivates the first terminal 11, another user (for example, a second user) may use the first terminal 11 to access a data communication network, wherein a process of using the first terminal 11 by the second user is similar to the process of the first user, and will not be elaborated herein.

Alternatively, in the process of using the first terminal 11 by the first user, the second user may also use the first terminal 11 in a similar manner. Moreover, the user data of the first user is stored in the first storage region, and user data of the second user is stored in a second storage region. That is, the first terminal 11 may be used by multiple users at the same time.

For example, a display screen (for example, a touch screen) of the first terminal 11 may be divided into two parts to present the UI of the first user and a UI of the second user respectively. The first user and the second user use the terminal through respective UIs respectively.

For example, the first terminal 11 may present the UI of the first user on the display screen and run the UI of the second user on a background. The first user may use the terminal through the UI, and the second user may use the terminal for communication and the like through Bluetooth.

It is to be noted that, in the embodiment of the disclosure, the first terminal 11 may be used by multiple users and user data of the multiple users is stored in respectively independent storage regions in the first terminal 11 respectively. That is, user data of different users is stored respectively, and in general, it is impossible for a certain user to access the user data of the other users. However, authorized user data may be accessed by the other users.

For example, the first user may set a right over part of (for example, a user data block DATA1) in the user data to be open by authorization, and then the other users may access the authorized user data block DATA1.

For example, the first user may set conditional authorization. For example, a right over part (for example, a user data block DATA2) of the user data is set to be semi-open, and in a setting process, only part of users (for example, a manner of limiting IDs of the users may be adopted) are allowed to access the user data block DATA2. In such a manner, only the users specified by the first user may access the user data block DATA2.

In the embodiment of the disclosure, the operator divides the service provided by it into different grades, and the user may use the corresponding service by virtue of the corresponding identity credentials. Then, the user may access the network of the operator by virtue of the identity credentials through any available terminal, and flexibility of use of the user over the corresponding service may be improved.

Figure 7:
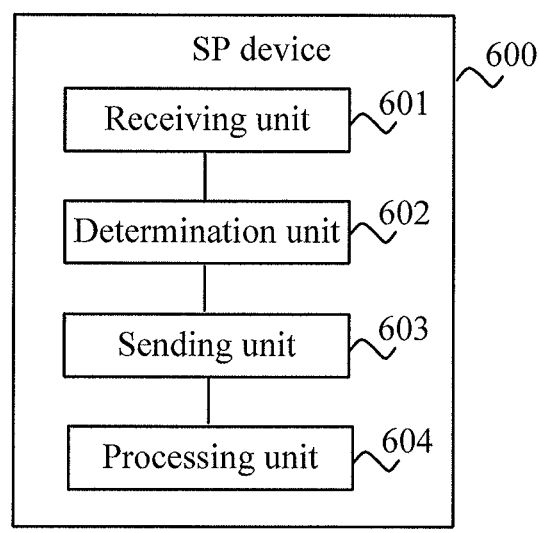
FIG. 7 illustrates a schematic block diagram of an SP device according to an embodiment of the disclosure.

FIG. 7 illustrates a schematic block diagram of an SP device according to an embodiment of the disclosure. The SP device 600 shown in FIG. 7 includes a receiving unit 601, a determination unit 602, a sending unit 603 and a processing unit 604.

The receiving unit 601 is configured to receive a first authentication request sent by a first terminal, the first authentication request including a first identity credential of a user.

The determination unit 602 is configured to determine an ID of the user and a priority of the first identity credential according to the first authentication request.

The sending unit 603 is configured to send context data of the user to the first terminal through a cloud service.

The processing unit 604 is configured to enable a first service for the first terminal according to the priority of the first identity credential.

In the embodiment of the disclosure, the SP device loads the context data of the user for the terminal according to the identity credential, sent by the terminal, of the user, and provides the corresponding service. In such a manner, a unified security identity authentication manner may be implemented, a seamless user experience may be provided for the user, usability may be improved, and optimal utilization of resources may also be implemented.

Wherein, the context data of the user includes at least one of a phonebook of the user, call records of the user, short message records of the user, browsing records of the user, data of APPs used by the user, an account and password of the user and a UI used by the user.

Alternatively, as an embodiment, the sending unit 603 is specifically configured to:

encrypt the context data of the user by virtue of a key valid in a specific time range; and send the encrypted context data of the user to the first terminal through the cloud service.

In the embodiment of the disclosure, the key may get invalid after the context data of the user is completely sent. The key is a key derived according to at least one of the ID of the user and an ID of the first terminal.

In the embodiment of the disclosure, the first identity credential of the user may include a primary credential or a secondary credential, wherein the primary credential may include at least one of: a DNA, a fingerprint, an iris and a voiceprint, wherein the secondary credential may include at least one of: a digital certificate, a digital signature, a user card and a password, wherein a priority of the primary credential is higher than a priority of the secondary credential.

Moreover, the first identity credential may be provided for the first terminal by an SP during subscription between the first terminal and the SP, and the first identity credential may be loaded through a specific programming interface or hardware. The first identity credential may also be provided for the first terminal by a terminal which has passed authentication. At this moment, the first terminal may be a sensor.

Alternatively, as an embodiment, the receiving unit 601 is further configured to receive a second authentication request sent by a second terminal, the second authentication request including a second identity credential of the user;

the determination unit 602 is further configured to determine the ID of the user and a priority of the second identity credential according to the second authentication request;

the sending unit 603 is further configured to send the context data of the user to the second terminal through the cloud service; and the processing unit 604 is further configured to enable a second service for the second terminal according to the priority of the second identity credential, wherein the first service may be different from the second service.

In the embodiment of the disclosure, the determination unit 602 may specifically be configured to:

determine the ID and priority corresponding to the first identity credential according to a pre-stored corresponding relationship.

Or, the determination unit 602 may specifically be configured to:

send the first authentication request to an identity authentication server; and receive the ID and priority of the first identity credential sent by the identity authentication server.

Alternatively, as an embodiment, the processing unit 604 may further be configured to:

perform charging according to a usage condition of the user for the first service and the second service.

Alternatively, as an embodiment, the sending unit 603 is further configured to:

send a charging request to a unified charging server to enable the unified charging server to charge a user account, wherein the charging request includes the ID, and the user account corresponds to the ID one to one.

In the embodiment of the disclosure, the priority of the first identity credential may be different from the priority of the second identity credential.

Alternatively, as an embodiment, the receiving unit 601 is further configured to:

receive a deauthentication request sent by the first terminal, the deauthentication request being configured to request the SP device to stop providing the first service for the first terminal; and the processing unit 604 is further configured to:

stop providing the first service for the first terminal.

Alternatively, as an embodiment, the processing unit 604 is further configured to:

when stopping providing the first service for the first terminal, perform charging according to the usage condition of the user for the first service.

Figure 8:
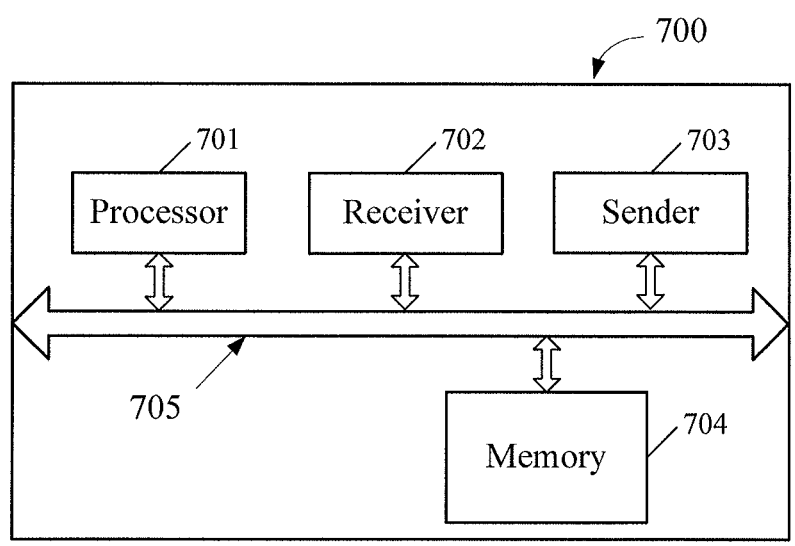
FIG. 8 illustrates a schematic block diagram of an SP device according to another embodiment of the disclosure.

It is to be noted that, in the embodiment of the disclosure, the receiving unit 601 may be implemented by a receiver, the sending unit 603 may be implemented by a sender, and the determination unit 602 and the processing unit 604 may be implemented by a processor. As shown in FIG. 8, an SP device 700 may include a processor 701, a receiver 702, a sender 703 and a memory 704, wherein the memory 704 may be configured to store subscription information of a user, and may further be configured to store codes executed by the processor 701 and the like.

Each component in the SP device 700 is coupled together through a bus system 705, wherein the bus system 705 includes a data bus, and further includes a power bus, a control bus and a state signal bus.

The SP device 600 shown in FIG. 7 or the SP device 700 shown in FIG. 8 may implement each process implemented by the SP device in the embodiments shown in FIG. 1 to FIG. 6, which will not be elaborated herein to avoid repetition.

It is to be noted that the method embodiments of the disclosure may be applied to a processor or implemented by the processor. The processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 9:
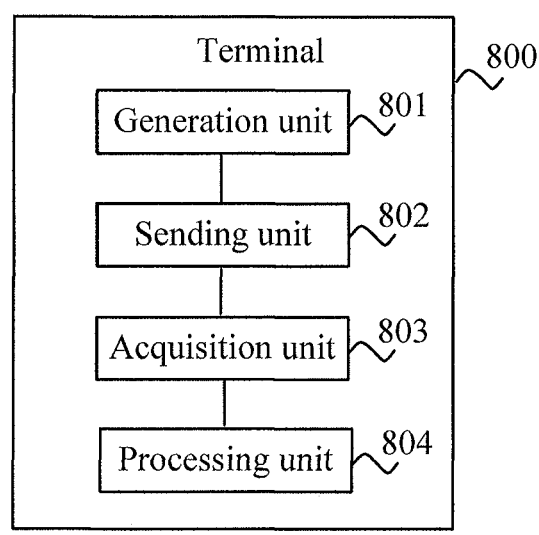
FIG. 9 illustrates a schematic block diagram of a terminal according to an embodiment of the disclosure.

FIG. 9 illustrates a schematic block diagram of a terminal according to an embodiment of the disclosure. The terminal 800 shown in FIG. 9 includes a generation unit 801, a sending unit 802, an acquisition unit 803 and a processing unit 804.

The generation unit 801 is configured to generate an authentication request of requesting to access an SP device, the authentication request including an identity credential of a user.

The sending unit 802 is configured to send the authentication request to the SP device.

The acquisition unit 803 is configured to, when the authentication request is accepted, acquire and load context data of the user.

The processing unit 804 is configured to use a corresponding service provided for the terminal by the SP device according to a priority of the identity credential.

In the embodiment of the disclosure, the terminal is subjected to identity authentication of the SP device according to the identity credential of the user, and acquires and loads the context data of the user, and the SP device may provide the corresponding service for the user. In such a manner, a unified security identity authentication manner may be implemented, a seamless user experience may be provided for the user, usability may be improved, and optimal utilization of resources may also be implemented.

Wherein, the context data of the user includes at least one of a phonebook of the user, call records of the user, short message records of the user, browsing records of the user, data of APPs used by the user, an account and password of the user and a UI used by the user.

It can be understood that the context data of the user may be encrypted by virtue of a first key valid in a specific time range, wherein the first key may get invalid after the context data of the user is completely sent. Moreover, the key is a key derived according to an ID of the user and/or an ID of the terminal.

In the embodiment of the disclosure, the identity credential of the user may include a primary credential and a secondary credential, wherein the primary credential may include at least one of: a DNA, a fingerprint, an iris and a voiceprint, wherein the secondary credential may include at least one of: a digital certificate, a digital signature, a user card and a password, wherein a priority of the primary credential is higher than a priority of the secondary credential.

Moreover, the identity credential of the user may be input into the terminal by the user. The identity credential of the user may also be provided for the terminal by an SP during subscription between the terminal and the SP, and the identity credential may be loaded through a specific programming interface or hardware. The identity credential of the user may further be provided for the terminal by a terminal which has passed authentication. At this moment, the terminal may be sensor.

Alternatively, as an embodiment, the acquisition unit 803 is specifically configured to:

receive the context data, sent to the terminal by the SP device through the cloud service, of the user, and load the context data of the user.

Alternatively, as an embodiment, the sending unit 802 may further be configured to:

send a first data request to a first terminal, the first data request being configured to request to load the context data of the user; and the acquisition unit 803 may specifically be configured to:

when the first data request is accepted, receive and load the context data, sent by the first terminal, of the user.

In the embodiment of the disclosure, the acquisition unit 803 may specifically be configured to:

receive the context data, sent by the first terminal, of the user through WiFi, Bluetooth, an NFC technology, Zigbee or a wired connection.

In the embodiment of the disclosure, the acquisition unit 803 may further be configured to:

receive a second data request sent by a second terminal, the second data request being configured to request to load the context data of the user;

the processing unit 804 is further configured to:

verify whether the second data request is accepted; and the sending unit 802 is further configured to:

when the second data request is accepted, send the context data of the user to the second terminal.

Alternatively, as an embodiment, the sending unit 802 may further be configured to:

send a first authorization request to a third terminal, the first authorization request being configured to request to load the identity credential of the user; and the acquisition unit 803 may further be configured to:

when the first authorization request is accepted, receive and load the identity credential, sent by the third terminal, of the user.

Alternatively, as an embodiment, the terminal further includes a storage unit, configured to store the identity credential of the user, and the acquisition unit 803 may further be configured to:

receive a second authorization request sent by a fourth terminal, the second authorization request being configured to request to load the identity credential of the user;

the processing unit 804 is further configured to:

verify, by the terminal, whether the second authorization request is accepted; and the sending unit 802 is further configured to:

when the second authorization request is accepted, send the identity credential of the user to the fourth terminal.

Wherein, the identity credential of the user may be encrypted by virtue of a second key valid in a specific time range. The second key may get invalid after the identity credential of the user is completely sent. The second key may be a key derived according to at least one of the ID of the user and the ID of the terminal.

Alternatively, as an embodiment, the acquisition unit 803 may specifically be configured to: receive the identity credential from the third terminal through WiFi, Bluetooth, the NFC technology, Zigbee or the wired connection.

Alternatively, as an embodiment, the sending unit 802 may further be configured to:

send a deauthentication request to the SP device, the deauthentication request being configured to request the SP device to stop providing the corresponding service for the terminal; and the processing unit 804 is further configured to:

delete the loaded context data of the user.

Figure 10:
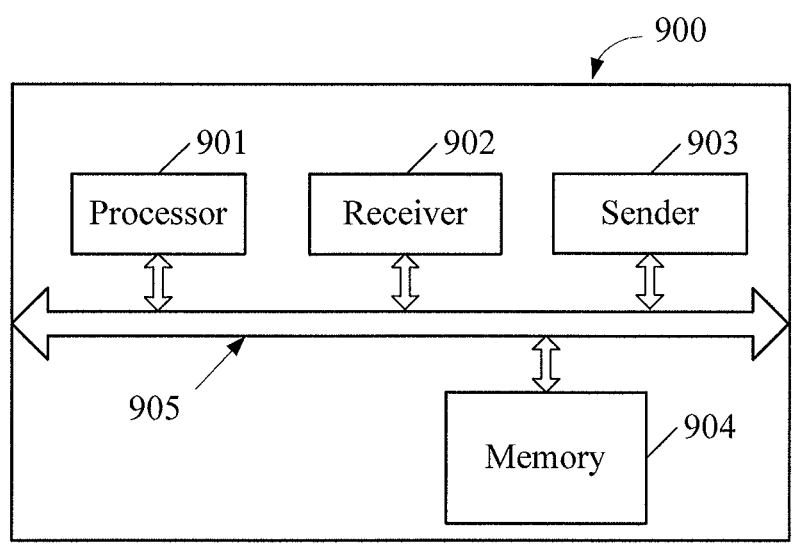
FIG. 10 illustrates a schematic block diagram of a terminal according to another embodiment of the disclosure.

It is to be noted that, in the embodiment of the disclosure, the acquisition unit 803 may be implemented by a receiver, the sending unit 802 may be implemented by a sender, and the generation unit 801 and the processing unit 804 may be implemented by a processor. As shown in FIG. 10, a terminal 900 may include a processor 901, a receiver 902, a sender 902 and a memory 904, wherein the memory 904 may be configured to store user information, and may further be configured to store codes executed by the processor 901 and the like.

Specifically, a logical storage region in the memory 904 may be configured to store the user information, including an identity credential, subscription information, UI and the like of a user.

Each component in the terminal 900 is coupled together through a bus system 905, wherein the bus system 905 includes a data bus, and further includes a power bus, a control bus and a state signal bus.

The terminal 800 shown in FIG. 9 or the terminal 900 shown in FIG. 10 may implement each process implemented by the terminal in the embodiments shown in FIG. 1 to FIG. 6, which will not be elaborated herein to avoid repetition.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solution. Those skilled in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiment for convenient and brief description and will not be elaborated herein.

In some embodiments provided by the disclosure, it should be understood that the disclosed system, device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A terminal authentication method, comprising:
sending, by a terminal, a first authorization request to a third terminal which has passed authentication of a Service Provider (SP) device with an identity of a user, the first authorization request being configured to request to load an identity credential of the user;
when the first authorization request is accepted, receiving and loading, by the terminal, the identity credential, sent by the third terminal, of the user;
generating, by the terminal, an authentication request of requesting to access the SP device, the authentication request comprising the identity credential of the user;
sending, by the terminal, the authentication request to the SP device;
when the authentication request is accepted, acquiring and loading, by the terminal, context data of the user from the third terminal, wherein the context data is generated by the third terminal in a process of using a service provided by the SP device; and
using, by the terminal, the corresponding service provided for the terminal by the SP device according to a priority of the identity credential and the context data of the user acquired from the third terminal.

2. The method according to claim 1, wherein the context data of the user comprises at least one of a phonebook of the user, call records of the user, short message records of the user, browsing records of the user, data of Applications (APPs) used by the user, an account and password of the user and a User Interface (UI) used by the user.

3. The method according to claim 1, wherein the acquiring and loading the context data of the user comprises:
receiving the context data, sent to the terminal by the SP device through a cloud service, of the user, and loading the context data of the user;
or,
sending a first data request to a first terminal, the first data request being configured to request to load the context data of the user, and when the first data request is accepted, receiving and loading the context data, sent by the first terminal, of the user.

4. The method according to claim 3, wherein the context data of the user is encrypted by virtue of a first key valid in a specific time range.

5. The method according to claim 4, wherein the first key gets invalid after the context data of the user is completely sent.

6. The method according to claim 4, wherein the key is a key derived according to at least one of an Identifier (ID) of the user and an ID of the terminal.

7. The method according to claim 1, further comprising:
receiving, by the terminal, a second data request sent by a second terminal, the second data request being configured to request to load the context data of the user;
verifying, by the terminal, whether the second data request is accepted; and when the second data request is accepted, sending, by the terminal, the context data of the user to the second terminal, to enable the second terminal to use a service provided by the SP device.

8. The method according to claim 1, wherein the identity credential of the user is stored in the terminal, and the method further comprises: when the terminal has passed authentication of the SP device with the identity of the user,
receiving, by the terminal, a second authorization request sent by a fourth terminal, the second authorization request being configured to request to load the identity credential of the user;
verifying, by the terminal, whether the second authorization request is accepted; and
when the second authorization request is accepted, sending, by the terminal, the identity credential of the user to the fourth terminal, to enable the fourth terminal to pass authentication of the SP device.

9. The method according to claim 1, wherein the identity credential of the user is encrypted by virtue of a second key valid in a specific time range, the second key gets invalid after the identity credential of the user is completely sent and the second key is a key derived according to at least one of the ID of the user or the ID of the terminal.

10. The method according to claim 1, wherein the identity credential of the user comprises a primary credential and a secondary credential,
wherein the primary credential comprises at least one of: a DeoxyriboNucleic Acid (DNA), a fingerprint, an iris and a voiceprint,
wherein the secondary credential comprises at least one of: a digital certificate, a digital signature, a user card and a password,
wherein a priority of the primary credential is higher than a priority of the secondary credential.

11. The method according to claim 1, further comprising:
sending, by the terminal, a deauthentication request to the SP device, the deauthentication request being configured to request the SP device to stop providing the corresponding service for the terminal; and
deleting, by the terminal, the loaded context data of the user.

12. A terminal, comprising:
a processor, configured to generate an authentication request of requesting to access a Service Provider (SP) device, the authentication request comprising an identity credential of a user;
a sender, configured to send the authentication request to the SP device; and
a receiver, configured to, when the authentication request is accepted, acquire and load context data of the user from the third terminal, wherein the context data is generated by the third terminal in a process of using a service provided by the SP device; and
a processor, configured to use a corresponding service provided for the terminal by the SP device according to a priority of the identity credential and the context data of the user acquired from the third terminal,
wherein the sender is further configured to:
send a first authorization request to a third terminal which has passed authentication of the SP device with an identity of the user, the first authorization request being configured to request to load the identity credential of the user; and
the receiver is further configured to:
when the first authorization request is accepted, receive and load the identity credential, sent by the third terminal, of the user.

13. The terminal according to claim 12, wherein the receiver is specifically configured to: receive the context data, sent to the terminal by the SP device through a cloud service, of the user, and load the context data of the user; or,
wherein the sender is further configured to: send a first data request to a first terminal, the first data request being configured to request to load the context data of the user; and the receiver is specifically configured to: when the first data request is accepted, receive and load the context data, sent by the first terminal, of the user.

14. The terminal according to claim 12, wherein the receiver is further configured to:
receive a second data request sent by a second terminal, the second data request being configured to request to load the context data of the user;
the processor is further configured to:
verify whether the second data request is accepted; and
the sender is further configured to:
when the second data request is accepted, send the context data of the user to the second terminal.

15. The terminal according to claim 12, further comprising a storage unit, configured to store the identity credential of the user, wherein the receiver is further configured to: when the terminal has passed authentication of the SP device with the identity of the user,
receive a second authorization request sent by a fourth terminal, the second authorization request being configured to request to load the identity credential of the user;
the processor is further configured to:
verify, by the terminal, whether the second authorization request is accepted; and
the sender is further configured to:
when the second authorization request is accepted, send the identity credential of the user to the fourth terminal.

16. The method according to claim 1, wherein when the authentication request is accepted, the terminal accesses the SP device, that has been accessed by the third terminal with the same identity of the user, to use the service provided for the terminal by the SP device.

17. The terminal according to claim 12, wherein when the authentication request is accepted, the terminal accesses the SP device, that has been accessed by the third terminal with the same identity of the user, to use the service provided for the terminal by the SP device.

* * * * *